Patented Jan. 20, 1953

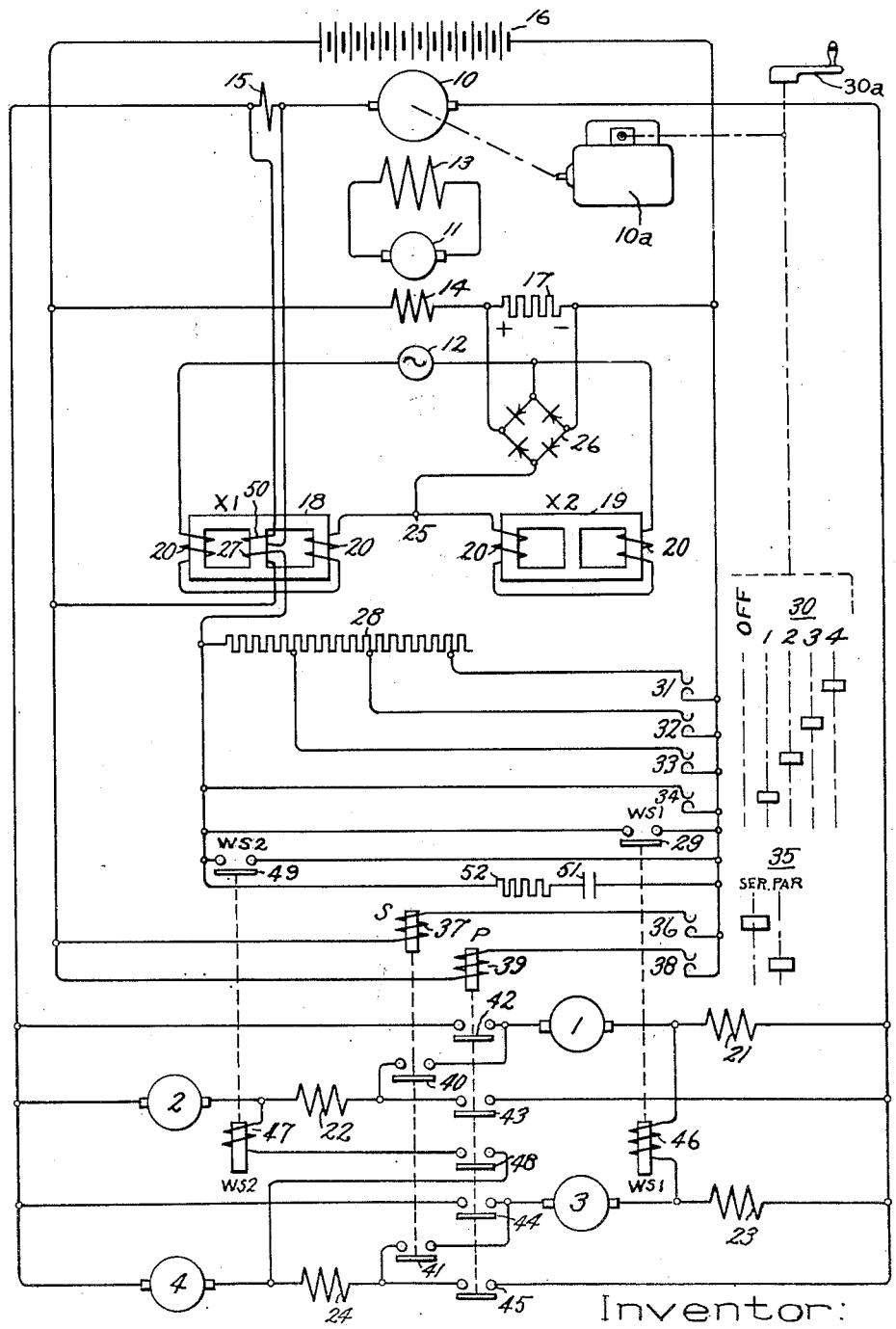

2,626,362

UNITED STATES PATENT OFFICE 2,626,362

POWER CIRCUIT CONTROL SYSTEM

August V. Johansson, Erie, Pa., assignor to General Electric Company, a corporation of New York Application January 17, 1950, Serial No. 139,054

8 Claims. (Cl. 290—17)

My invention relates to electric power circuit control systems and has particular significance in connection with the control of wheel slip in a traction vehicle such as a gas electric locomotive.

Heretofore, wheel slip has been a major problem in large diesel electric locomotives. Various schemes have been previously proposed. Some of these schemes merely provide an alarm system to notify the operator of the slipping condition and are dependent upon the operator to take corrective measures. Such schemes are disadvantageous in that they depend upon the human element and the difficulty may not be corrected rapidly enough to prevent damage and usually cannot be manually corrected rapidly enough to prevent high speed of slipping wheels which then makes the condition even more difficult to correct.

Even in the prior art schemes intended to stop wheel slippage by automatically reducing or removing voltage applied to the driving motors, there have heretofore been disadvantages due to slow removal of power, insufficient time of power removal, too rapid reapplication of power, or too slow reapplication of power. This is so because these schemes have not been directly correlated with tractive effort which is the true cause of wheel slip.

With any wheel slipping, the motor or motors connected to the slipping axle accelerates to a higher speed than the other motors and may reach a speed causing damage on account of resultant high mechanical stresses. Furthermore, the slipping of any wheels causes a disadvantageous loss of traction which should be corrected as rapidly as possible.

It is especially desirable today to use automatic rather than manual means of eliminating locomotive wheel slip because modern locomotives often comprise three or four similar units subject to a single master controller. It is desirable to reduce power only on the unit having slipping wheels in order to maintain the greatest possible total tractive effort in spite of the wheel slip condition.

It is an object of the present invention to provide simple and inexpensive means for overcoming the above-mentioned difficulties.

It is a further object of the present invention to provide means for automatically correcting wheel slippage in an electric traction vehicle.

A still further object of the present invention is to provide an electric power circuit control system affording rapid removal of power such as to prevent slipping wheels from attaining much speed after slip begins, affording power removal for a time sufficient (such as to allow deceleration of slipping wheels to train speed) affording power removal for a time short enough (such as to assure that the train will not lose speed), affording power reapplication at a proper rate (such as to assure that slip will be unlikely to recur), and affording means for avoiding overshoot of restoration of tractive effort.

In the embodiment herein illustrated and described, the means employed in this connection comprises for a plurality of motors connected in loop circuit with a generator, loop circuit current limiting means arranged responsive to existing loop circuit current values to operate on generator excitation while adapted to be recalibrated either by throttle position changes or, at advanced throttle positions, by wheel slip indication. The indication is derived in conventional manner as from wheel slip relays having their coils connected across equipotential points in the motor circuits. The throttle adjusts the current limit for a given notch setting by means of one of a plurality of contacts each across one of a set of resistors, while the contacts of the wheel slip relays are placed in parallel across the entire set of resistors. A condenser is also placed in parallel across the resistors to provide slow restoration to the current limit of the throttle notch held by the operator when the slipping condition has been corrected.

Further objects and advantages will become apparent and my invention will be better understood from consideration of the following description taken in connection with the accompanying drawing which is a schematic diagram of a portion of the power and control circuits for a locomotive such as a diesel-electric locomotive in which a main generator 10, exciter 11 and an auxiliary alternator 12 are all adapted to be driven by a source or sources of mechanical power such as one or more diesel or other type engines and including the principal gas engine prime mover depicted at 10a. Generator 10 is provided with a shunt type field exciting winding 13 adapted to be separately excited from the exciter 11 and the exciter is provided with a separately excited field winding 14. The output circuit of the main generator is a series or loop circuit and includes a generator commutating pole winding 15 and a plurality of motors 1—4, inclusive, each having a series field winding 21—24, respectively. Conventionally, each such electric motor is adapted to drive a single axle or pair of wheels and conventionally suitable reversing switches are employed but such switches are well-known to those skilled in the art, and, therefore, are not shown on the drawing.

In a system of this sort, it is desirable to automatically regulate the main generator field excitation to provide optimum vehicle performance without exceeding maximum traction generator current and thus prevent overheating generator or motors. Therefore, the input to the exciter field winding 14 is derived from a regulated source of voltage and, as shown, this winding is connected across a 75 volt battery 16 in series with a bucking source of regulating voltage appearing across a resistor 17. The voltage across resistor 17 is produced by the rectified output of a magnetic amplifier circuit employing a pair of saturable reactors, X1 and X2, respectively. As illustrated, each reactor has a three-legged core (18 and 19, respectively) with an A. C. winding 20 on each of the two outer legs and one or more D. C. (i. e., saturating) windings may be placed on the center leg. The A. C. windings are energized from the alternator 12 (which may be a 400 cycle source of supply) to create alternating flux in the outer parts of each reactor core but these windings do not create flux in the center leg. Meanwhile, the D. C. windings are adapted to create flux in all parts of any associated core so that they may be used to saturate the core to varying degrees. Any saturation of the core varies the impedance of the associated A. C. windings so that a pair of such reactors having their alternating current windings arranged in series provide a voltage dividing circuit (known as a magnetic amplifier), in which the voltage drop across the A. C. windings associated with either reactor is determined by the current in any D. C. winding of that reactor compared to the effect from the other reactor. The output may (as shown) be taken from one leg of the A. C. input and from a mid-point 25 between the two reactors and rectified by a rectifier such as the full wave rectifier 26 with the output of the rectifier applied to a resistance such as 17 to control the voltage thereacross.

In the illustrated embodiment, reactor core 18 is provided with a D. C. center leg winding 27 connected across the battery 16 in series with a bank of resistors 28. The various sections of resistance 28 are adapted to be progressively brought in circuit by controller contacts 31—34 of a master switch indicated generally at 30 and which is assumed to be actuated through a mechanical connection with a throttle handle 30a which the engineman uses to regulate the speed of all of the locomotive units as by varying the rate of fuel feed to each main gas engine 10a. Although it is obvious that any number of steps may be employed, I have shown switch 30 developed for the five positions of "off" 1, 2, 3 and 4; 4 being the highest speed position. A series parallel selector switch 35 is also provided and I have shown switch 35 adapted to close its contact 36 (for the "series" position thereof) to energize an "S" contactor coil 37 and adapted to close its contact 38 (for the "parallel" position thereof) to energize a "P" contactor coil 39. In conventional manner, the motors 1—4 may be selectively placed either in series pairs (when S contactor contacts 40 and 41 are closed) or (by opening S contacts 40 and 41 and closing P contactor contacts 42, 43, 44 and 45) all in parallel with each other.

In order to be affected by slippage of the driving wheels of the vehicle, a wheel slip relay WS1 has its actuating coil 46 connected to compare the voltage drop across series field 21 of motor 1 and series field 23 of motor 3. Preferably, the motors are of similar design and thus the actuating coil is connected between like points which are normally of the same potential so that little or no current flows through the coil of the relay so long as the motors are operating at the same speed. Similarly, wheel slip relay FS2 is provided for the motors 2 and 4 with its actuating coil 47 connected to the mid-points between the series field and armature of each of the two motors. If desired WS2 coil 47 may be arranged in series with an interlock 48 closing when P contactor coil 39 is energized so that this wheel slip relay will be operative only for the parallel motor connection when it is responsive to the balance of relatively small voltage drops across series fields. For the series connection of motors, WS1 alone is adequate. The contact members 29 and 49 of the relays WS1 and WS2 are connected in parallel circuit relation across the resistance bank 28 so that they are adapted to short out all resistance in case wheel slippage causes either of the relays to operate.

Any varying motor load is an unconstant impedance and, therefore, mere regulation of the voltage supplied to the motor is not of itself sufficient to control motor torque or, in the case of an electric vehicle, tractive effort. In order to properly adjust tractive effort, which (in the illustrated embodiment) is a function of loop current, it is desirable to correlate the control with something which is a function of loop current such as the drop across generator commutating field 15. Accordingly, this voltage drop is applied to a saturating or D. C. coil 50 on the X1 reactor so that the magnetic amplifier, comprising reactors X1 and X2 and the rectified output across X2 will be responsive to current variations in the loop circuit between generator 10 and the motors. Thus the magnetic amplifier is responsive to a control quantity derived from generator armature current compared to throttle handle setting except in the case of wheel slip at which time the effect is the same as if the throttle handle were on the first operative notch.

In operation, the system just described functions as follows: direct current flowing through winding 50 of reactor core 18 saturates this reactor and increases the voltage across the A. C. windings of reactor core 19. This produces more current in resistor 17 and thereby decreases the current flowing through field 14 of the exciter which thereby controls main generator excitation and regulates main loop current output at a certain value. The bias coil 27 of reactor X1 controls this generator current limit prearranged value with the ladder of contacts 31—34 producing for each of the four operative notches a different relative bias current and thus a different maximum available tractive effort for the particular notch. It will be apparent from the diagram that for the first power notch, all of the resistance 28 is shorted out, thus all of the D. C. bias voltage appears across coil 27, whereas, for the last power notch all of the resistance 28 is in circuit so that minimum voltage will appear across bias coil 27 unless relay WS1 or WS2, or both, operate to short-circuit the ladder of controller contacts, thereby resetting the current limit system to the first notch value of tractive effort. In order to control the rate of the system's return to normal when the wheel slip relay subsequently drops out, a capacitor 51 is provided in parallel across the WS1 and WS2 contacts 29 and 49. Thus when the slipping wheels have been brought back to normal speed and any previously energized wheel slip relay drops out, the capacitor 51 will slowly charge and thus the current limit setting will slowly be restored to that which prevailed before the slip started. This slow restoration of tractive effort tends to prevent the starting of another slip. A resistor 52 may be used in series with capacitor 51 to limit the current through the relay contacts (to avoid welding) when the contacts 29 or 49 close thereby discharging the capacitor.

With the scheme of the invention there is no voltage limit correction to take care of wheel slip. This is advantageous because in any variable speed system the voltage must vary widely (depending on train speed in a traction application) to produce the same current and torque. It is apparent that the power circuit control of the invention does not operate directly upon voltage applied to the traction motors (as would be the case if wheel slip indication were used merely to reduce engine speed or generator voltage) and with the invention there is, upon wheel slip, a recalibration of generator current limit as well as provision for the subsequent slow restoration of power after the wheel slip has been corrected.

From the detailed description given, it is evident that when slipping starts, the operator (who still retains some control as he may entirely remove power) loses direct control of tractive effort above the first notch value until some time after the slipping wheels return to train speed. With the described system, power may be reduced so rapidly after slip starts that any wheel will reach only a slightly higher speed during slipping than it had before, so that when power is reduced it will take little time for the wheel to decelerate to train speed. Actually, the equipment may be readily designed so that the output of the magnetic amplifier applied across resistance 17 momentarily exceeds the voltage of battery 16, whereupon the generator excitation is not only removed but actually reversed, in order to rapidly bring the loop current down to the value corresponding to tractive effort desired to be applied during wheel slip. In the interim, wheel slip indication may be lost, but with the scheme of the invention condenser 51 acts as a device allowing only slow return to the value of manually selected current limit thereby avoiding overshoot of restoration of tractive effort.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A control system for a power circuit comprising a generator arranged in loop circuit with a plurality of motors, said control system comprising, supervisory control means, means for exciting said generator, means arranged responsive to loop current and adapted to vary the value of said generator excitation for limiting the current in said loop circuit, means arranged responsive to said supervisory control for recalibrating said loop circuit current limiting means, and means responsive to a difference in the speed of said motors for rendering said recalibrating means inoperative.

2. A control system for a plurality of motors connected in loop circuit with a generator, said system comprising a supervisory controller adapted to be advanced through a plurality of steps from full off to full on position, a resistance bank having portions adapted to be progressively connected in circuit as said controller is advanced, loop circuit current limiting means including a magnetic amplifier arranged responsive to existing loop circuit current values and adapted to be recalibrated by movement of said supervisory controller progressively connecting predetermined portions of said resistance bank, and means including at least one relay operable in response to a difference in the speed of said motors adapted to short out said resistance bank and render said recalibration inoperative at advanced supervisory controller positions.

3. A power circuit control system for a self-propelled vehicle having an electric generator, a plurality of driving motors, means for electrically connecting said motors to said generator, a field exciting winding on said generator, an exciter for controlling the energization of said generator field winding, a control field exciting winding for said exciter, and means for energizing said control field exciting winding, said control system comprising manually operable contacts, a resistance bank adapted to be progressively connected in circuit by said contacts, generator output current limiting means including a magnetic amplifier arranged responsive to generator output current values and adapted to vary the energization supplied to said exciter control field winding, means rendering said magnetic amplifier responsive to actuation of said manually operable contacts through interconnection with said resistance bank, means for rendering said last means inoperative and including a relay contact adapted to short out the whole of said resistance bank regardless of position of said manually operable contacts, and a relay coil operatively associated with said relay contact and arranged to be energized upon overspeeding of any of said motors due to wheel slip.

4. In combination a gas electric self-propelled vehicle and an automatic wheel slip correction circuit, said vehicle having a plurality of traction motors, a generator adapted to supply current to said motors, loop circuit means connecting said generator and said motors, a gas engine arranged to drive said generator, manually positionable fuel throttle and governing means for said gas engine and for controlling the ordinary operation of said vehicle, means including a generator field exciting winding and an adjustable voltage supply therefor for separately exciting said generator, and means associated with said manually positionable governing means and with said exciting means for regulating the generator excitation at predetermined values determined by the position of said governing means, and said automatic wheel slip correction circuit comprising wheel slip indicating means including a relay having its coil connected across normally equipotential points in the circuits of two of said traction motors and energized responsive to overspeeding of either of said motors due to wheel slip, said relay having a contact connected in circuit with said regulating means for rendering the manually predetermined operation of said regulating means inoperatively responsive to wheel slip, said contact connecting said regulating means to regulate the current output of said generator at a predetermined value independent of throttle handle setting.

5. In combination a gas electric self-propelled vehicle and an automatic wheel slip correction circuit, said vehicle having a plurality of traction motors, a generator adapted to supply current to said motors, loop circuit means connecting said generator and said motors, a gas engine arranged to drive said generator, positionable fuel throttle and governing means for said gas engine and for controlling the ordinary operation of said vehicle, means including a generator field exciting winding and an adjustable voltage supply therefor for separately exciting said generator, loop circuit current responsive means, a magnetic amplifier arranged to be responsive to said loop circuit current responsive means and ordinarily also responsive to position of said fuel throttle and governing means and arranged to affect said adjustable voltage supply for regulating the generator excitation at predetermined values determined by the position of said governing means compared to prevailing loop circuit current, and said automatic wheel slip correction circuit comprising wheel slipping indicating means including a relay having a coil connected across normally equipotential points in the circuits of two of said traction motors, said relay having a contact connected generally across the circuit of said magnetic amplifier adapted to be varied by said positionable governing means so that at time of a wheel slip said magnetic amplifier adapted to regulate the generator excitation will be responsive to existing loop circuit current but independent of the position of said fuel throttle and governing means.

6. In combination a gas electric self-propelled vehicle and an automatic wheel slip correction circuit, said vehicle having a plurality of traction motors, a generator adapted to supply current to said motors, a field exciting winding for said generator, an exciter machine adapted to energize said generator field exciting winding, a field exciting winding for said exciter, loop circuit means connecting said generator and said motors, a gas engine arranged to drive said generator, means for driving said exciter, positionable fuel throttle and governing means for said gas engine and having a plurality of notched steps having electrical interlock means, a regulated source of voltage for said exciting field winding and comprising a battery in series circuit with a bucking source of regulating voltage across a resistor, a saturable core type magnetic amplifier circuit adapted to provide a rectified output and arranged to supply the same across said resistor, said magnetic amplifier circuit including a plurality of direct current input windings, means arranged to be responsive to loop circuit current and electrically connected to one of said input windings, a resistance bank connected across said throttle interlocks to be progressively connected in circuit thereby, connections from said resistance bank arranged in series with said constant voltage source, and connected to another of said magnetic amplifier circuit input windings for automatically regulating said generator exciter excitation at predetermined values determined by the position of said governing means compared to prevailing loop circuit current, said automatic wheel slip correction circuit comprising a plurality of relays each having its coil connected across normally equipotential points in the circuits of two of said traction motors, and each of said relays having a contact adapted to short circuit said resistance bank to supply substantially the full value of said constant voltage to the associated magnetic amplifier input winding thereby to automatically regulate said exciter excitation at predetermined values determined only by prevailing loop circuit current.

7. In combination a gas electric self-propelled vehicle and an automatic wheel slip correction circuit, said vehicle having a plurality of traction motors, a generator adapted to supply current to said motors, a field exciting winding for said generator, an exciter machine adapted to energize said generator field exciting winding, a field exciting winding for said exciter, loop circuit means connecting said generator and said motors, a gas engine arranged to drive said generator, means for driving said exciter, positionable fuel throttle and governing means for said gas engine and having a plurality of notched steps having electrical interlock means, a regulated source of voltage for said exciting field winding and comprising a battery in series circuit with a bucking source of regulating voltage across a resistor, a saturable core type magnetic amplifier circuit adapted to provide a rectified output and to supply the same across said resistor, said magnetic amplifier circuit including a plurality of direct current input windings, means arranged to be responsive to loop circuit current and electrically connected to one of said input windings, a resistance bank connected across said throttle interlocks to be progressively connected in circuit thereby, connections from said resistance bank arranged in series with said constant voltage source, and connected to another of said magnetic amplifier circuit input windings for automatically regulating said generator exciter excitation at predetermined values determined by the position of said governing means compared to prevailing loop circuit current, and said automatic wheel slip correction circuit, comprising a plurality of relays each having its coil connected across normally equipotential points in the circuits of two of said traction motors, each of said relays having a contact adapted to short circuit said resistance bank to apply the full value of said constant voltage to the associated magnetic amplifier input winding thereby to automatically regulate said exciter excitation at predetermined values determined only by prevailing loop circuit current, and a capacitor connected in parallel circuit relation with said relay contacts across said resistance bank to control the rate of return of said wheel slip correction circuit to normal.

8. In a control system for a prime mover electric locomotive having a prime mover, a throttle therefor, an electric generator adapted to be driven by said prime mover, a series connected field winding for said generator, a separately excited generator field winding, an exciter machine adapted to energize said separately excited field winding, a separately excited field winding for said exciter, means including a constant voltage source and a bucking variable voltage for energizing said exciter field winding, a magnetic amplifier comprising a plurality of saturable reactors each adapted to be energized by alternating current and adapted to be saturated in varying degrees to provide an amplified output responsive to direct current changes, means for energizing said reactors with alternating current, means including connections from said generator series connected field winding to one of said reactors for saturating said reactor responsive to generator load current, means including a rectifier connected in the circuit of the amplified output of one of said reactors and connected to produce said bucking variable voltage proportional to the difference in the saturation of said reactors, additional means for saturating one of said reactors and comprising connections from a source of constant voltage through a resistance bank, means for progressively varying the effective portion of said resistance bank responsive to movement of said throttle handle thereby to progressively decrease the saturation of said last-mentioned reactor as said throttle handle is moved from full off to full on position, a plurality of traction motors adapted to be energized from said generator, a plurality of wheel slip relays having their coils connected across normally equal potential points in the circuits of said motors and having contacts adapted to be closed when the respective relay coil is energized due to unbalancing of currents in one motor circuit with respect to that in another, connections causing said relay contacts to short out said resistance bank, and a circuit comprising capacitance and a series resistance arranged in parallel around said resistance bank whereby said generator load current may be rapidly brought down to the value corresponding to tractive effort desired to be applied during wheel slip while the capacitance allows slow return to the value of current limit selected by the throttle setting and the resistance in series therewith acts to prevent welding of said relay contacts.

AUGUST V. JOHANSSON.

REFERENCES CITED

The following references are of record in the file of this patent:

UNITED STATES PATENTS

| Number | Name | Date |
|---|---|---|
| 1,367,745 | Hellmund | Nov. 30, 1920 |
| 2,175,820 | Baston | Oct. 10, 1939 |
| 2,250,673 | Kew | July 29, 1941 |
| 2,266,326 | Lillquist | Dec. 16, 1941 |
| 2,280,378 | Cowin | Apr. 21, 1942 |
| 2,286,370 | Miller | June 16, 1942 |
| 2,313,503 | Baldwin | Mar. 9, 1943 |
| 2,328,994 | Ogden | Sept. 7, 1943 |
| 2,371,832 | Lillquist | Mar. 20, 1945 |
| 2,449,399 | Lillquist | Sept. 14, 1948 |
| 2,516,198 | Frier | July 25, 1950 |